United States Patent

Savonuzzi

[11] Patent Number: 6,165,404
[45] Date of Patent: Dec. 26, 2000

[54] METHOD OF PRODUCING STRATIFORM ARTICLES AND PRODUCTS

[75] Inventor: Andrea Savonuzzi, Sheboygan, Wis.

[73] Assignee: Lear Corporation, Southfield, Mich.

[21] Appl. No.: 08/133,283

[22] Filed: Oct. 7, 1993

Related U.S. Application Data

[63] Continuation of application No. 07/780,060, Oct. 21, 1991, abandoned.

[30] Foreign Application Priority Data

Oct. 24, 1990 [EP] European Pat. Off. .............. 90810816

[51] Int. Cl.⁷ ........................... B29C 45/14; B29C 61/02
[52] U.S. Cl. ........................... 264/266; 264/259; 264/275
[58] Field of Search .................................. 264/316, 279, 264/259, 266, 230, 246, 247, 271.1, 254, 255, 275

[56] References Cited

U.S. PATENT DOCUMENTS

| | | | |
|---|---|---|---|
| 3,551,540 | 12/1970 | Pellicciari et al. | 264/230 |
| 4,307,058 | 12/1981 | Morello et al. | 264/510 |
| 4,481,160 | 11/1984 | Bree | 264/254 |
| 4,595,544 | 6/1986 | Maruyama et al. | 264/230 |
| 4,622,191 | 11/1986 | Takeuchi | 264/230 |
| 4,779,390 | 10/1988 | Repper et al. | 52/222 |
| 4,781,956 | 11/1988 | Zimmermann et al. | 428/43 |
| 4,810,452 | 3/1989 | Taillefert et al. | 264/247 |
| 4,830,929 | 5/1989 | Ikeda et al. | 428/326 |
| 4,873,045 | 10/1989 | Fujita et al. | 264/259 |

FOREIGN PATENT DOCUMENTS

| | | |
|---|---|---|
| 045421 | 10/1982 | European Pat. Off. . |
| 326408 | 1/1989 | European Pat. Off. . |
| 326408 | 8/1989 | European Pat. Off. . |
| 2114181 | 10/1972 | Germany . |

OTHER PUBLICATIONS

Patent Abstracts of Japan vol. 11, No. 241 (M–614) (2688) Aug. 7, 1987.
European Search Report, Patent No. 90810816.0– Aug. 28, 1991,

*Primary Examiner*—Angela Ortiz
*Attorney, Agent, or Firm*—Brooks & Kushman P.C.

[57] ABSTRACT

A method of producing self-supporting stratiform articles having a substrate layer formed of a thermoplastic polymer composition and at least one surface portion formed by a layer made of a cover material, such as a textile; the method comprises: providing a mould cavity in conformity with the article that is to be produced and having a female cavity portion and a male cavity portion; the female cavity portion has at least one surface in conformity with the covered surface portion; the method according to the invention is characterized by providing, for each covered surface portion, a preformed laminate comprising the cover layer and a thermoplastic shielding layer; the shielding layer acts as a permeation barrier protecting the cover layer against the hot polymer composition that will be injected for forming the substrate; the shielding layer may also act as a shrinkage buffer; the preformed laminate is substantially self-supporting and provides for safe positioning of its cover layer at a desired portion of the female mould and, hence, of the final article; because the shielding layer is formed of a material that is substantially compatible with the thermoplastic polymer composition of said substrate layer, i.e. can interfuse therewith, a firm bond between the cover layer and the substrate can be formed upon solidification.

20 Claims, 1 Drawing Sheet

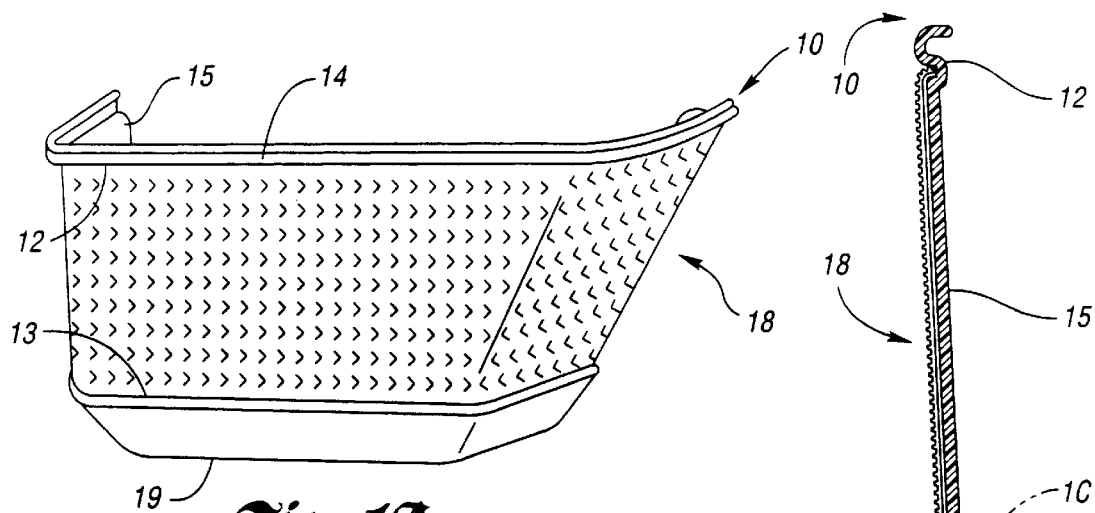
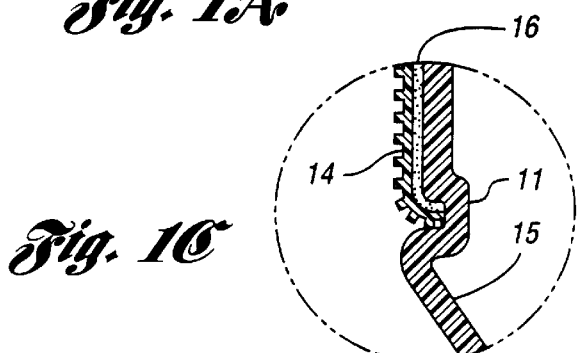
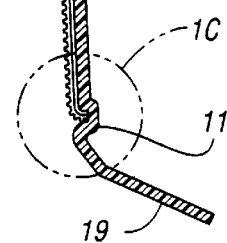
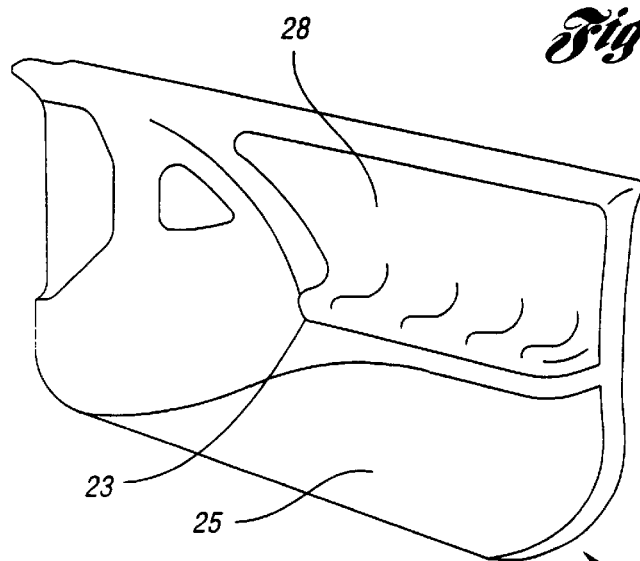
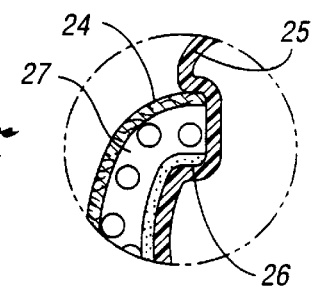
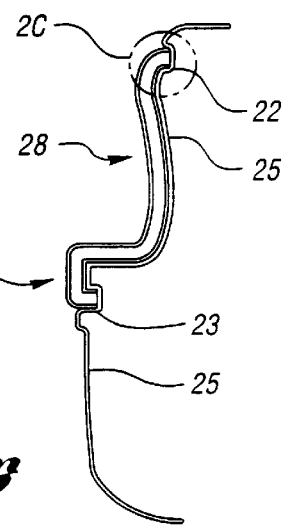

METHOD OF PRODUCING STRATIFORM ARTICLES AND PRODUCTS

This is a continuation of co-pending application Ser. No. 07/780,060 filed on Oct. 21, 1991, now abandoned.

BACKGROUND OF THE INVENTION (1) Field of the Invention

This invention generally relates to molding of plastics and specifically to a method of producing an essentially self-supporting stratiform article, typically a trim panel of the type used in the interior of automotive vehicles such as vertical wall panels including door panels.

(2) Description of the Prior Art

Generally, trim panels for automobiles are composed of a substrate or base layer for mechanical strength and of an outer cover for visual appearance, feel, and/or comfort. Also, the outer cover frequently comprises more than one area with a specific or distinct color, texture, or resilience; for example, one or more vinyl-covered area(s) for resistance against soil and abrasion are combined with one or more, e.g. two to four areas covered with a textile such as carpeting, cloth or velvet, a foamed layer, man-made or natural leather for pleasing appearance, comfort or soil resistance.

Safe and easy placement of segments of cover stock cut in accordance with the surface area(s) that is (are) to be provided with the particular cover layer, and—most importantly—in close register with one or more selected area(s), presents several problems some of which may need mutually exclusive solutions so as to require some compromise in the balance of properties.

Most of the problems connected therewith tend to be aggravated by the fact that typical trim panels are "profiled", i.e. not essentially planar but shaped "three-dimensionally" to some extent so as to have a "depth" dimension in addition to having width and length. For example, protruding arm rests previously made as separate parts for subsequent mounting on a trim panel should be molded integrally with the panel to simplify production, and such arm rests, typically, require a specific surface structure, be it for comfort of use or for visual appearance. Additional problems are encountered when environmental requirements must be met, e.g. regarding disposal or recycling, or when some desired properties of a material defy meeting another requirement, e.g. the desirable toughness of polypropylene contrasted with its adhesive-repellant surface properties. Further, various aspects of the problems involved, such as structural integrity, ease of manufacture and off-set avoidance tend to increase, sometimes geometrically, with the number of the differing cover segments, e.g. more than two and up to eight or even ten.

The art is replete with teachings of methods for making trim panels and the disclosure in U.S. Pat. Nos. 4,781,956, 4,779,390, 4,810,452, 4,830,929 and 4,873,045 is mentioned by way of example representing what applicant feels to be the most pertinent art herein. Yet, the multiplicity of methods proposed previously might be an indication of the fact that no generally satisfactory method has been found up to now, notably when mass production technology is concerned.

OBJECTS AND SUMMARY OF THE INVENTION

Accordingly, it is a main general object of the invention to provide for an improved new method that avoids limitations of the prior art and notably permits commercially feasible and advantageous production of trim panels and other types of self-supporting stratiform articles substantially without limitations as to the number of differing surface areas and without problem of register between the surface-covered areas and specific contours of a three-dimensional or profiled panel. Further objects will become apparent as this specification proceeds.

Now, according to a first general embodiment, the invention comprises a method of producing an essentially self-supporting stratiform article having a substrate layer formed of a normally solid thermoplastic polymer composition, and at least one surface portion formed by a cover layer made of a generally flexible material having an external visual appearance that differs from the substrate layer but is firmly connected therewith.

As used herein, the term "essentially self-supporting stratiform article" is intended to refer to a physical structure having maximum length and width dimensions that are significantly greater than the gauge or "thickness" even though that structure may have a significant "profile depth" when viewed perpendicularly relative to the main length and width extension, or "main plain", of the article. Generally, this implies a minimum surface area, say of at least about 100 square centimeters; the article will be "essentially self-supporting" if it retains its structural integrity and shape when its main plane is arranged in an essentially horizontal position while the article is supported only at a portion of its periphery. However, some reversible deformation of the article by bending under its own weight does not detract from it being considered to be "self-supporting".

The term "substrate" refers to the article's constituent stratum or layer that normally provides the dominating portion of the mass of the article and, in essence, determines its mechanical strength properties. The term "normally solid thermoplastic polymer composition" is intended to refer to a material that contains, or essentially consists of, an organic polymer that is solid at normal ambient temperatures. The thermoplastic polymer may contain pigments, additives, etc. provided that the resulting composition is thermoplastic, i.e. becomes soft and fluid at elevated temperatures of typically above 100° C., generally above 120° C. and preferably above 150° C. Polyolefins are generally preferred herein and polypropylene is particularly preferred.

The term "generally flexible" as used herein to characterize the cover layer is intended to encompass sheet materials including films, woven, non-woven or knit textile materials, natural or man-made leather, foamed sheet materials and generally any material actually or potentially of use in prior art methods of forming trim panels; these materials are flexible in the sense of being capable of bending without rupture and, frequently, have some stretch capability.

The difference of visual appearance between cover layer portions at the "outer", i.e. visually exposed side of the trim panels as used, e.g. mounted in a vehicle, and the substrate can be of any type including shade, color, texture, feel etc. It should be noted, however, that portions of the article's surface might be formed by the uncovered substrate which may, but need not, have an embossed, matted or otherwise structured surface appearance formed upon molding.

In its general embodiment the invention comprises the steps of:

A) providing a mould cavity in substantial shape conformity with the stratiform article that is to be manufactured; such cavity is essentially defined by a female cavity portion and a male cavity portion, and the female cavity portion has at least one surface area, e.g. two to ten or more, shaped in conformity with the at least one surface portion;

B) providing at least one preformed laminate comprising the cover layer, or layer segment, and a normally solid thermoplastic shielding layer substantially co-extensive with the cover layer, or segment; the shielding layer is made of a material that is substantially compatible with the thermoplastic polymer composition of the substrate layer so as to permit autogenous interbonding (i.e. merely under the impact of heat and some contact pressure but without external substances) of substrate and shielding;

C) positioning the at least one preformed laminate in the female cavity portion so that the cover layer contacts a surface portion of the female cavity;

D) injecting the thermoplastic polymer composition while in a fluid state into the mould cavity for substantially filling the cavity and for interbonding with the thermoplastic shielding layer;

E) allowing the thermoplastic polymer composition to solidify and to form the article; and removing the article from the mould cavity.

Injection molding is a well-established art, of course, and prior art apparatus and operating conditions can be used for practicing the invention. Since this is within normal competence of those skilled in the molding art, injection moulding requirements for use in practicing the invention will not be explained in detail herein.

It is believed, however, that the shielding layer aspect as well as the means to use and form such a layer constitute an essential feature of the present invention and will be discussed in more detail below.

Generally, the shielding layer as used according to the invention is a constituent of a preformed laminate which, in turn, can be produced by conventional methods, e.g. in a laminating press and with operating conditions known per se in the lamination art; typically, the preformed laminate used according to the invention will be "self-supporting" in the sense defined above for the finished article because this greatly improves positioning and holding of the preformed laminate in the female mold portion during injection moulding of the substrate.

It is assumed that the advantageous action of the shielding layer is due to several contributive effects which, in turn, can be controlled by a suitable choice of the parameters involved. Generally, the shielding layer must be both thermoplastic and compatible with the composition of the substrate layer. The term "compatible" as used herein means the capacity of one thermoplastic substance or composition to interbond, i.e. to adhesively interfuse or intermelt with another thermoplastic substance or composition when heated in mutual contact to softening temperatures so as to form a bonding interface generally caused by some interflow and/or hot-blending of the constituents involved in the area of the common interface.

An essential and main effect of the shielding layer is to securely and adhesively hold the cover layer in the mould cavity while at the same time protecting it from the impact of the fluid (i.e. being heat-plasticized to the extent permitting injection molding) thermoplastic composition that is injected into the mould cavity for forming the substrate layer. So, while the shielding layer must be compatible with the injected thermoplastic composition to permit interfusion with the latter, it should not "melt down" when in contact with the hot injected mass, i.e. prevent or, at least, substantially retard formation of an essentially fluid stratum immediately adjacent the cover layer when the thermoplastic polymer composition for forming the substrate layer is injected into the mould cavity. The shielding layer, in other words, should act as a permeation barrier between the cover layer material and the hot composition injected into the mould cavity for forming the substrate layer.

This can be achieved in a number of ways all of which tend to increase overall fluidity or viscosity of the material of the shielding layer with respect to the fluidity or viscosity of the material of the substrate layer when exposed to injection molding temperatures; for example, the shielding layer could be formed of a thermoplastic polymer which—while compatible and capable of interfusing with the thermoplastic polymer of the substrate layer—has a higher melt viscosity than the latter. A further method is to reduce thermal conductivity, i.e. to increase thermal insulating properties of the shielding layer, e.g. by incorporation of a component that has a low thermal conductivity. Yet, another method is by means of filler-induced structural viscosity effects known per se in the art of plastics processing.

A generally preferred method believed to combine some of the above mentioned effects is to use a shielding layer composed of a substrate-compatible thermoplastic polymer in intimate mixture with a particulate filler that remains solid at the injection temperature of the substrate composition. Typically, a particulate filler of the "granular" type, i.e. having no particular "length" dimension, should have a maximum particle size of less than about half the thickness of the shielding layer, preferably below 500 micrometers, e.g. about 50 to 300 micrometers. Conventional fillers of both inorganic as well as organic provenience can be used. Cellulosic fillers, e.g. wood powder, are a preferred filler species for use in the shielding layer according to the invention. Commercially available sheet materials, e.g. those sold under the trade name "wood-stock" by ASAA Inc, Sheboygan, Wis., USA, with or without an adhesive coating for improved bonding with standard cover materials are a preferred material for the shielding layer according to the invention. As will be apparent to those skilled in the art, preformed laminates of typical cover layer materials and shielding layer materials can be formed by conventional lamination methods, e.g. in a press in which a layer of the cover material is compressed in a mould together with a layer of the shielding material in a thermally plastified state.

Preferably, the shielding layer used in the method of the invention provides for at least one further shielding effect, namely that of a shrinkage buffer, i.e. so as to reduce the impact of shrinkage of the substrate while solidifying in the injection mould upon the cover layer. While shrinkgage can be defined and measured in terms of rates or other relations, a simple criterion is used herein to define optimum results: since a stratiform body has two elongated or "longitudinal" extensions (i.e. in the "length" as well as the "width" dimension), a simple method of determining pertinent shrinkage properties is to measure a longitudinal end-to-end dimension of the mould cavity, prepare a molded shape of a polymer composition by injection moulding and measure the difference between an end-to-end mould cavity dimension and the corresponding dimension of the molded article.

With many typical thermoplastic compositions used commercially for injection molding purposes, such shrinkage will be in the range of from about 2 to 7% (linear extensions), i.e. the measured dimension of the molded product will have a length that is 2 to 7% smaller than the length of the corresponding cavity dimension.

So, while the shielding layer must be capable of interbonding with the substrate composition upon injection molding, the shielding layer preferably has a significantly reduced mould shrinkage typically amounting to 25 to 75% of the shrinkage of the substrate composition, e.g. having a shrinkage of only about 0.5 to 1.5% if the substrate has a shrinkage of 2%. Preferably, the shrinkage of the shielding layer should be about half that of the substrate layer or even less. The aim of shrinkage buffering is, of course, to prevent distorsions, wrinkling and other forms of deformation of the cover layer material since the latter, in many of its typical and prefered forms, will have substantially no mould shrinkage, such as a textile layer made of cotton, wool or of synthetic fibers of use herein, i.e. showing no significant deformation when used in the injection molding step of the inventive method.

The requirement of mutual compatibility tends to limit the possibility of varying the polymer constituents of substrate and shielding layer for shrinkage buffering. However, a generally preferred method of reducing the shrinkage of the shielding layer is to incorporate a shrinkage-reducing component in the composition used for making the shielding layer of the preformed laminate, typically a filler that remains solid when heated to injection molding temperatures. In other words, if the shielding layer is made, for example, of a mixture of about equal parts of a thermoplastic polymer having a shrinkage (as defined above) of 2% and of a non-thermoplastic filler having substantially no shrinkage, the resulting shielding layer will have shrinkage significantly below 2%, e.g. about 1%. While various fillers having such an effect will be apparent to those skilled in the art, particulate wood is a typical example for use to achieve shrinkage buffering in a shielding layer made of a polyolefin, such as polypropylene.

When using preferred polymer-filler blends for forming the shielding layer, the thermoplastic polymer constituent may provide from about 20 to about 80%, preferably about 40 to about 60%, by weight, of the shielding layer (i.e. based upon the weight thereof), while the filler constituent forms a complementary portion, i.e. from about 80 to about 20%, preferably from 60 to 40%, by weight, again based upon the weight of the shielding layer. The shielding layer may contain further components provided that the above discussed properties of compatibility and capacity to interfuse with the material of the substrate and of at least one shielding effect are not affected. For example, the shielding layer may contain conventional additives and adjuvants including pigments and stabilizers, or may contain recycled or regenerated materials of the same stock materials.

Preferred thermoplastic polymers for use both in the substrate as well as in the shielding layer are selected from polyolefins; polypropylene is particularly preferred. Homopolymers as well as copolymers including graft copolymers prepared by conventional polymerization from suitable monomeric olefins are suitable herein; copolymers of the ABS type (i.e. those typically made of acrylonitrile, butadiene and styrene or substituted equivalents) represent another example. Again, additives and adjuvants conventionally incorporated in thermoplastic polymer compositions for injection molding can be used in forming the substrate layer according to the invention.

Typically, the substrate layer of a stratiform article made according to the invention, e.g. for use as a vertical trim panel, will have a thickness or gauge in the range of from 1 to 10 mm while the shielding layer has a thickness in the range of from 0.5 to 3 mm. The cover layer, on the other hand, can have any thickness or gauge in which typical materials for use as cover layers are applied in trim panels or other stratiform articles, e.g. carpets, man-made leather, foamed sheet materials etc., in the range of from about 200 micrometers to about 10 mm.

DESCRIPTION OF THE DRAWINGS

The invention will now be further illustrated without limitation by means of the enclosed drawings in which:

FIG. 1A is a semi-diagrammatic elevational view of a stratiform article produced according to the invention;

FIG. 1B is a sectional view of FIG. 1A with a portion, indicated by a circle, shown in enlarged scale for clarity;

FIG. 2A is a semi-diagrammatic elevational view of another example of a stratiform article produced according to the invention; and FIG. 2B is a sectional view of FIG. 2A, again with a circled portion shown in an enlarged scale for clarity.

The stratiform article 10 illustrated in FIGS. 1A and 1B is a vertical trim panel for use in automobiles formed of substrate layer 15 produced by injection molding of polypropylene in a conventional moulding cavity (not shown) together with a preformed laminate 18 made, in turn, by laminating a shielding layer 16 composed of polypropylene in mixture with wood powder and a carpet cover layer 14. Panel 10 is provided with an upper bead 12 and a lower bead 13. Substrate 15 is interfusingly connected with the preformed laminate 18 in the area between upper bead 12 and lower bead 13 while the lower portion 19 of substrate 15 has no cover layer and may have a smooth or "embossed" surface structure depending upon the surface characterstics of the injection mould. It will be understood that the injection mould portion for forming the "outer" face, i.e. the decorated side of panel 10 where the textile cover layer 14 determines its visual appearance, is formed by the "female" portion of the injection mould (not shown) while the "backside" of panel 10 is formed by the "male" portion of the injection mould. It will be noted that the female as well as the male portion of the injection mould may consist of one or more injection mould components. Further, it is to be understood that the upper end of the preformed laminate 18 has an analogous structure as the lower end (shown in the circled portion of FIG. 1B).

Thus, the edge portion of the laminate is curved to abut within a recess 11 adjacent bead 13 so that the visual appearance of the decorated side of panel 10 is not marred by any unsightly edges of the preformed laminate 18 or its shielding layer 16. Further, due to the permeation barrier as well as the shrinkage buffer effect provided by shielding layer 16, the textile cover layer 14 will show neither unsightly spots of permeated fluid resin from substrate 15 nor wrinkles caused by mould shrinkage of substrate 15.

FIG. 2A is a semi-diagrammatic elevational view of a door panel 20 formed of substrate 25, e.g. of polypropylene, and a preformed laminate 28 constituting an arm rest. As shown in FIG. 2B and notably the circled portion thereof, the preformed laminate 28 consists of a shielding layer 26 of the same type as used in FIG. 1A and 1B and of a relatively thick cushion top layer comprised of an outer "skin" portion 24, e.g. made of vinyl, and a foamed core 27, e.g. made of expanded polyurethane or expanded polyolefin including expanded polyethylene. In this instance, shielding layer 26, in addition to providing interbonding connection with substrate 25, acts both as a permeation barrier as well as a heat shield preventing undue thermal deformation of the cushion layer constituents 24, 27 even though the latter may have a substantially lower softening temperature than the thermoplastic polymer composition used for injection molding of substrate 25.

Again, as in FIGS. 1A and 1B, the preformed laminate 28 consisting of the shielding layer 26 and the cushion layer components 24, 27 will be positioned in the female portion of the injection mould (not shown) used for forming door panel 20. The thermoplastic composition used for injection molding of the substrate 18 and 28, respectively, will be introduced into the injection mould via one or more outlet openings in the male portion of the injection mould that defines the less critical inner side of panels 10, 20. By the same token, reinforcing elements, e.g. ribs, as well as mounting brackets, can be formed integrally with substrate 15, 25 without the danger of producing "sink-marks" as explained below.

For manufacturing panels 10, 20 the preformed laminate is first produced from the decorative layer materials and the shielding layer materials in a conventional compression press die, e.g. at a pressure of about 30 lbs per square inch and a laminating temperature (at backing board) of about 350° F. Lamination is achieved in the compression cycle and the laminate is trimmed in the die. The preformed laminate or insert so produced is positioned in the matching surface portion of the female injection molding die mounted in a conventional press. The injection mould is closed by connecting the female and the male injection die portions, and the thermoplastic moulding component for the substrate of the pane is injected through the male (or punch) side of the die at the required injection temperature as specified by the producer of the injection molding compound used. Peel strength tests of the resulting bond between the cover layer and the substrate indicate integral bonding by intermelting the surface.

The inventive method helps to solve the problem of so-called sink-marks resulting from mould shrinkage where the thickness of the substrate layer is substantially increased so that shrinkage phenomena that act perpendicularly relative to the surface of the substrate, e.g. in the area of reinforcing ribs our mounting stubs, cause a visual cavity in the outer surface of the substrate layer. When practicing the invention such marks are no problem because the site of the local thickness increase can easily be positioned below a preformed laminate area where the shielding layer provides a barrier against formation of sink-marks.

Generally, the invention provides an improved method of producing self-supporting stratiform articles of the type discussed and having a substrate layer formed of a thermoplastic polymer composition and at least one surface portion formed by a layer made of a cover material, such as a textile; a mould cavity for injection molding the desired article is provided and has a female cavity portion and a male cavity portion; according to the invention there is provided, for each covered surface portion, a preformed laminate comprising the cover layer and a thermoplastic shielding layer; the shielding layer acts as a permeation barrier protecting the cover layer against the hot polymer composition that will be injected for forming the substrate; the shielding layer may also act as a shrinkage buffer; the preformed laminate is substantially self-supporting and provides for safe positioning of its cover layer portion at a desired portion of the female mould and, hence, of the final article; because the shielding layer is formed of a material that can interfuse with the thermoplastic polymer composition of the substrate layer, a firm bond between each cover layer and the substrate will be formed.

Various changes of the above illustrated examples within the scope of the following claims will be apparent to those skilled in the art.

What is claimed is:

1. A method of producing an essentially self-supporting stratiform article usable as an interior automotive panel, comprising the steps of:
    disposing a pre-formed, contoured laminate insert comprising a generally flexible outer cover and an inner thermoplastic layer in a female mold shaped in conformity with the outer cover of the insert, with the outer cover disposed in conformity with the female mold but having an exposed edge portion; and
    injection molding a thermoplastic polymer composition that is substantially compatible with the inner thermoplastic layer into a mold cavity formed by a male mold and the female mold containing the insert so that the thermoplastic composition substantially fills the cavity, contacts the thermoplastic layer and interfuses therewith, and the thermoplastic polymer composition contacts and covers the exposed edge portion of the insert on its front, back and edge;
    allowing the thermoplastic polymer composition to solidify, thereby forming a substrate which is interbonded to the inner thermoplastic layer of the insert, and having a recess in which the edge portion of the insert is disposed, wherein the insert covers only a portion of an outer surface of the substrate, the substrate and insert together forming a panel member; and
    removing the panel member from the mold cavity.

2. The method of claim 1, wherein the inner thermoplastic layer exhibits shrinkage as a result of injection molding of the thermoplastic polymer which is about half or less of the shrinkage exhibited by the substrate.

3. The method of claim 1, wherein the outer cover is made of a material selected from textile materials and leather, and has a surface texture different from the outer surface of the substrate, and the inner thermoplastic layer has a thickness and composition effective to protect the outer cover from the thermoplastic polymer composition during injection molding.

4. The method of claim 1, wherein the insert is positioned in the female mold with a pair of opposing exposed edge portions which become disposed in a pair of spaced recesses in the substrate after injection molding.

5. The method of claim 1, wherein the inner thermoplastic layer is formed of a material having, at a temperature at which the polymer composition of the substrate is fluid, a significantly higher viscosity than the polymer composition so as to provide a permeation barrier between the cover layer and the thermoplastic polymer composition.

6. The method of claim 1, wherein the inner thermoplastic layer comprises a thermoplastic polymer that is substantially compatible with the polymer composition of the substrate.

7. The method of claim 6, wherein the polymer composition of the substrate consists essentially of an organic thermoplastic polymer selected from polyolefins and ABS copolymers, and the substrate has a thickness in the range of from 1 to 10 mm, while the inner thermoplastic layer has a thickness in the range of from 0.5 to 3 mm.

8. The method of claim 7, wherein the thermoplastic polymer composition of the substrate comprises a major portion of polypropylene, and the inner thermoplastic layer comprises polypropylene and a particulate filler which consists essentially of particulate wood.

9. The method of claim 8, wherein the inner thermoplastic layer contains from 20% to 80% of polypropylene and from 80% to 20% of the filler.

10. The method of claim 2, wherein the outer cover is made of a material selected from textile materials and leather, and has a surface texture different from the outer surface of the substrate, and the inner thermoplastic layer has a thickness and composition effective to provide a permeation barrier between the cover layer and the thermoplastic polymer composition during injection molding.

11. The method of claim 10, wherein the insert is positioned in the female mold with a pair of opposing exposed edge portions which become disposed in a pair of spaced recesses in the substrate after injection molding.

12. The method of claim 10, wherein the insert includes a foam core which acts as a cushion layer interposed between the cover and the inner thermoplastic layer.

13. The method of claim 1, wherein the inner thermoplastic layer exhibits shrinkage as a result of injection molding of the thermoplastic polymer which is between about 25% to 75% of the shrinkage exhibited by the substrate.

14. A method of producing an essentially self-supporting stratiform article usable as an interior automotive panel, comprising the steps of:

disposing a pre-formed, contoured laminate insert comprising a generally flexible outer cover consisting essentially of a material selected from a textile material and a leather, and an inner thermoplastic shielding layer, in a female mold shaped in conformity with the outer cover of the insert, with the outer cover disposed in conformity with the female mold;

then injection molding a thermoplastic polymer composition that is substantially compatible with the inner thermoplastic shielding layer into a mold cavity formed by a male mold and the female mold containing the insert so that the thermoplastic composition substantially fills the cavity, contacts the thermoplastic shielding layer and interfuses therewith, the thermoplastic shielding layer acting as a permeation barrier for the thermoplastic polymer composition;

allowing the thermoplastic polymer composition to solidify, thereby forming a substrate which is interbonded to the shielding layer of the insert, the substrate and insert together forming a panel member; and removing the panel member from the mold cavity.

15. The method of claim 14, wherein the inner thermoplastic layer exhibits shrinkage as a result of injection molding of the thermoplastic polymer which is about half or less of the shrinkage exhibited by the substrate.

16. The method of claim 14, wherein the inner thermoplastic layer is formed of a material having, at a temperature at which the polymer composition of the substrate is fluid, a significantly higher viscosity than the polymer composition.

17. The method of claim 14, wherein the inner thermoplastic layer exhibits shrinkage as a result of injection molding of the thermoplastic polymer, which is between about 25% to 75% of the shrinkage exhibited by the substrate.

18. The method of claim 14, wherein the inner thermoplastic layer comprises a thermoplastic polymer that is substantially compatible with the polymer composition of the substrate, and the polymer composition of the substrate consists essentially of an organic thermoplastic polymer selected from polyolefins and ABS copolymers.

19. The method of claim 18, wherein the substrate has a thickness in the range of from 1 to 10 mm, while the inner thermoplastic layer has a thickness in the range of from 0.5 to 3 mm.

20. The method of claim 18, wherein the thermoplastic polymer composition of the substrate and the inner thermoplastic layer each comprise polypropylene.

* * * * *

UNITED STATES PATENT AND TRADEMARK OFFICE
CERTIFICATE OF CORRECTION

PATENT NO. : 6,165,404
DATED : December 26, 2000
INVENTOR(S) : Andrea Savonuzzi

Page 1 of 1

It is certified that error appears in the above-identified patent and that said Letters Patent is hereby corrected as shown below:

Column 10, claim 18,
Line 27, after "ABS" insert -- -type --.

Signed and Sealed this

Nineteenth Day of February, 2002

Attest:

JAMES E. ROGAN
Attesting Officer
Director of the United States Patent and Trademark Office